Dec. 20, 1927.
M. M. KIRTANE
1,653,575
OPTICAL SYSTEM FOR VIEWING TUBES
Filed July 1, 1925
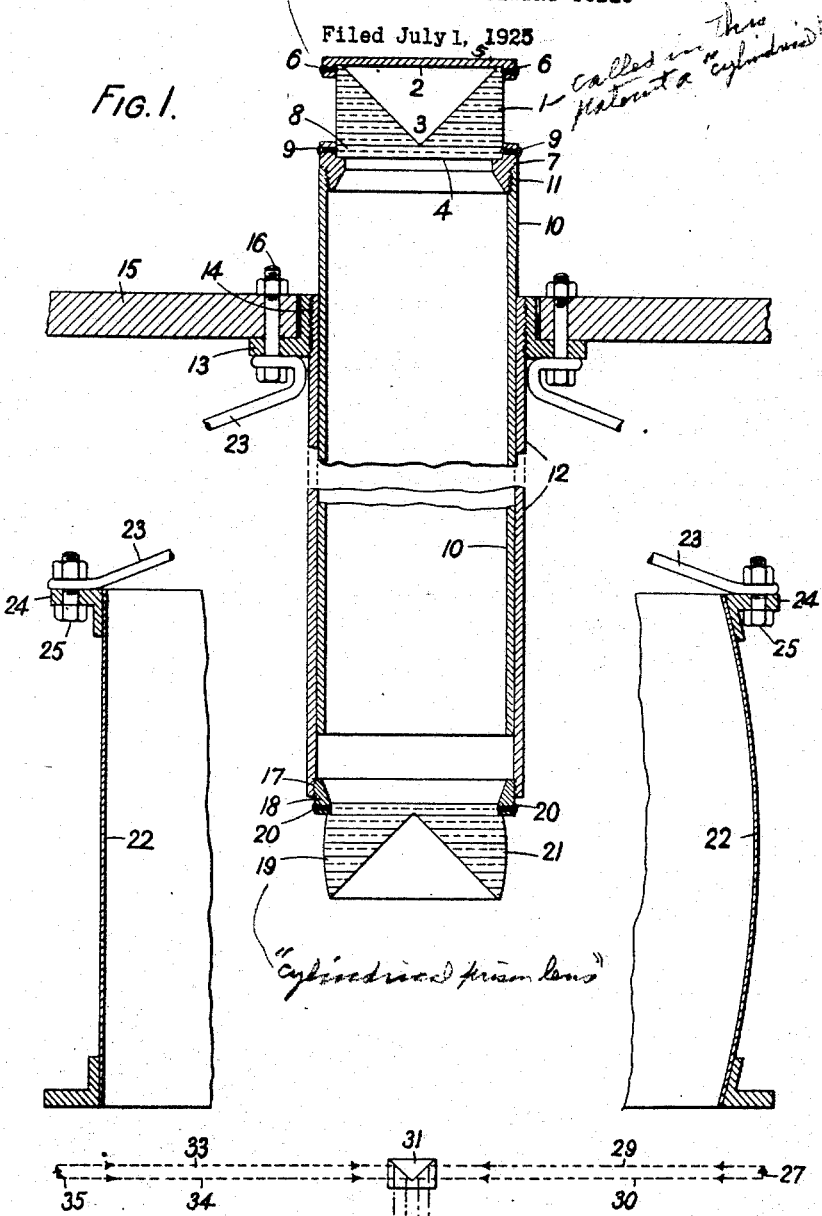
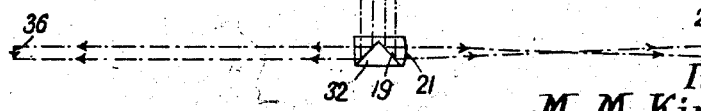
Inventor
M. M. Kirtane
by Wilkinson & Giusta
Attorneys.

Patented Dec. 20, 1927.

1,653,575

UNITED STATES PATENT OFFICE.

MAN MOHAN KIRTANE, OF INDORE, CENTRAL INDIA.

OPTICAL SYSTEM FOR VIEWING TUBES.

Application filed July 1, 1925, Serial No. 40,868, and in Great Britain August 13, 1924.

This invention relates to an improved system for submarine periscopes and the like and has for its object to so construct and arrange the optical elements thereof, that it will project, on a cylindrical screen, a complete panoramic and realistic picture or images of all the objects within the range of sight all round the submarine, these images being represented in their proper bearings, so that an object dead forward of the submarine will appear to the operator dead forward on the screen, and so on.

The present invention essentially comprises a top glass element having the exact configuration of a solid of rotation of a right angled isosceles triangle about one of its acute angles, so as to produce an air-cone of a definite apex angle, apex downwards, as if scooped out of a solid glass cylinder; and another bottom glass element of the same configuration as the top element hereinbefore mentioned, but with the differences that the apex of the air-cone is upwards, and also the periphery has the configuration of a convex lens in vertical section and resembles such a lens in its optical functions. These two elements when suitably mounted in line in a periscope tube combine to form on a vertical cylindrical screen, concentric with the axis of the periscope system and placed at the correct radius from said axis an erect and focussed image of the surroundings in their relative bearings.

In the accompanying drawings:—

Fig. 1 is a view of an optical system in vertical section and illustrates the construction according to the present invention and shows the parts of the optical system and the screen, their configurations, relative positions, and a suitable manner for their mechanical attachment generally.

Fig. 2 illustrates on the right hand side, the sequence of optical events or the image produced by the rays of light emanating from the object, during their passage through the optical elements and which finally result in the formation of an upright focussed image on the annular vertical screen. The left hand half shows that the image would be inverted, if the lower element had a plain cylindrical surface.

Referring to Fig. 1, which shows the construction adapted for use with the periscope of a submarine, (1) is the top glass element, or circular prism, as it is hereinafter conveniently called, being a solid of rotation of a right angled isosceles triangle about one of its acute angles, consequently resembling a solid glass cylinder from which is removed a conical portion to give an air cone, vertex downwards, of a definite apex angle, preferably 90°. The aforementioned air-cone has its base 2 above the apex 3 downwards. This element may conveniently have a diameter of 2" and a height of 1.1" or 1⅛" so as to have the apex 3 of the air cone about 1/15th or ⅛th of an inch above the base 4 of the circular prism. This element is preferably covered by means of a protective metallic cap 5 secured to the element by means of screws 6, 6 preferably counter-sunk in the glass. On the lower side, the glass element 1 is secured to and supported by a metallic collar 7, provided with a seat 8 for the edge of the gear and may be secured thereto by means of small screws 9, 9 preferably also counter-sunk in the glass. This collar is secured in the top end of the portion of the periscope tube 10 outside the submarine, say by means of screw threads 11.

At the other or lower end this portion 10 of the periscope tube is capable of being telescoped inside another tube 12 entirely inside the submarine, to permit of the alteration of the length of the periscope tube above the surface, for the required range of vision. The top end of this tube 12 engages in a collar 13 by means of suitable threads 14, the collar being secured to the deck plates 15 by means of bolts 16. The operation of telescoping the tube 10 inside the tube 12 is achieved preferably by means of a suitably geared rack and pinion arrangement (not shown).

The lower end of the tube 12 receives a collar 18 carrying the lower lens element 19, which may be secured in position by means of suitable screws 20 also countersunk in the glass.

This lower element 19 is fashioned similarly to the top element 1 and is preferably of the same size with the difference that the air cone is upright with its apex upwards and that it has its periphery 21 suitably ground to a shape resembling a convex lens in vertical section and corresponding in its effect to a construction of a prism and a plano-convex lens of a definite focal length.

The vertical cylindrical screen on which the image is finally formed is made preferably in four quadrants 22 coupled together and supported by means of a number of stays 23, preferably two per quadrant, engaging, for example, the upper external flange 24 on the screen by means of bolts 25 and being held at the collar 13 to the deck plates 15 by means of bolts 16 by which the collar 13 is supported. On coupling up the screen 22 forms a complete circle, concentric with the vertical axis of the periscope system, and at a distance from the periphery of the lower element 19, corresponding to the focal length of the prism lens which thus fixes the necessary diameter of the screen. Another method of supporting the screen is by means of suitable brackets fixed to the walls of the operator's cabin. Whatever the method adopted, the screen may conveniently be situated at a level a little above that of the operator's eyes so as to enable him to scan with ease the screen, which is preferably marked in degrees and their parts, and also has the fore-and-aft line of the submarine prominently indicated thereon. Although the method of attachment of the screen either by means of stays or brackets is suggested, the invention is not restricted to such an attachment, nor is a periscope system constructed according to the present invention limited to such an arrangement. In practice however it would be more suitable to use the bracket attachment as being the more rigid of the two. The dimensions of the screen preferably are about 4' 2" diameter by 6" or more in height.

The right hand half of Fig. 2 illustrates the sequence of optical events and the path followed by the rays from an object 27 until they form an upright focussed image 28 on the screen, and also shows by contrast the utility and function of the peripheral curvature of the circular prism-lens 19.

Following the rays 29, 30 one from the top and the other from the bottom of the object 27 (as seen to the right of Fig. 2) within the field of sight, it is apparent that they, owing to the totally internally reflecting surface of the air cone 31 are directed vertically down the periscope tube where they are again totally internally reflected by the surface of the air-cone 32 and are directed again horizontally. After this final reflection, they are, by virtue of the surface curvature 21, focussed to the upright image 28 on the screen. It will be noticed that the rays from the top change place with the rays from the bottom of the object on being reflected from the conical surface 32 of the element 19, and are again inverted by virtue of peripheral curvature 21.

In order to accentuate the definition of the image on the screen a system of four lenses placed confocally or a suitable system of such lenses may be preferably mounted inside the periscope tube 10 so that the image formed by the top element and the system may serve as the object for the bottom prism lens 19.

The effect obtained if the peripheral curvature is omitted is shown on the opposite side (the left side of Fig. 2) by a similar series of optical events occurring to the rays 33, 34 emanating from the object 35, from which it will be seen that without this curvature 21 the image 36 will be projected upside down or inverted. Figure 2 also emphasizes the point that the image is formed on the same side as the object, and therefore in the proper relative bearing, thus ensuring the representation and automatic projection of the images in their relative positions in respect of the surrounding objects sighted by a glance at the screen by the operator, without either ocular or nervous strain.

It will be obvious from the foregoing description that this invention will necessarily function most satisfactorily in the absence of general or diffused local illumination on the screen and therefore under the conditions in the operator's cabin as nearly approaching those in a light-tight room, as possible.

Furthermore the screen 22 instead of having a straight vertical wall or surface, may be curved vertically as shown at the right hand side of Figure 1, so that the image projected by the prism lens will be in focus, or substantially so, at all points.

What I claim and desire to secure by Letters Patent is:—

A periscope comprising in combination a tube, a cylindrical prism at the upper end of said tube and a cylindrical prism lens at the lower end of said tube, a circular screen surrounding the lower end of the periscope, said screen being of a curvature corresponding approximately to that of the prism lens and at the focal distance therefrom and means for extending telescopically the upper end of the said tube.

In testimony whereof I affix my signature.

MAN MOHAN KIRTANE.